United States Patent
Moon et al.

(10) Patent No.: US 10,331,256 B2
(45) Date of Patent: Jun. 25, 2019

(54) METHOD FOR CORRECTING SENSITIVITY OF TOUCH INPUT DEVICE THAT DETECTS TOUCH PRESSURE AND COMPUTER-READABLE RECORDING MEDIUM

(71) Applicant: HiDeep Inc., Gyeonggi-do (KR)

(72) Inventors: Ho Jun Moon, Gyeonggi-do (KR); Bon Kee Kim, Gyeonggi-do (KR); Se Yeob Kim, Gyeonggi-do (KR); Bong Jin Seo, Gyeonggi-do (KR); Tae Hoon Kim, Gyeonggi-do (KR); Myung Jun Jin, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/562,603

(22) PCT Filed: May 25, 2016

(86) PCT No.: PCT/KR2016/005504
§ 371 (c)(1),
(2) Date: Sep. 28, 2017

(87) PCT Pub. No.: WO2016/195308
PCT Pub. Date: Dec. 8, 2016

(65) Prior Publication Data
US 2018/0088721 A1    Mar. 29, 2018

(30) Foreign Application Priority Data
May 29, 2015   (KR) .................. 10-2015-0076459

(51) Int. Cl.
*G06F 3/044*   (2006.01)
*G06F 3/041*   (2006.01)

(52) U.S. Cl.
CPC ............ *G06F 3/0414* (2013.01); *G06F 3/044* (2013.01); *G06F 3/0418* (2013.01); *G06F 3/0412* (2013.01)

(58) Field of Classification Search
CPC .............................. G06F 3/044; G06F 3/0414
See application file for complete search history.

(56) References Cited

U.S. PATENT DOCUMENTS

| 9,779,674 B2 | 10/2017 | Yumoto et al. |
| 2011/0084932 A1* | 4/2011 | Simmons .............. G06F 3/0414 345/174 |

(Continued)

FOREIGN PATENT DOCUMENTS

| JP | 2013097628 | 5/2013 |
| KR | 1020090124086 | 12/2009 |

(Continued)

OTHER PUBLICATIONS

Corresponding International Search Report for PCT/KR2016/005504 dated Sep. 7, 2016. WO.
Japanese Office Action dated Aug. 28, 2018.

*Primary Examiner* — Hang Lin
(74) *Attorney, Agent, or Firm* — The Belles Group, P.C.

(57) ABSTRACT

A sensitivity compensation method of a touch input device sensing a touch pressure may be provided. The sensitivity compensation method includes: defining a plurality of reference points spaced apart from each other on a touch sensor panel; generating a reference data corresponding to a capacitance change amount sensed by applying a predetermined pressure to the plurality of reference points; generating, on the basis of the reference data, an interpolated data corresponding to a capacitance change amount for a random point present between the plurality of reference points; calculating, on the basis of the generated reference data and interpolated data, with respect to the reference point and random (Continued)

point respectively, a compensation factor for compensating a sensitivity of the touch input device to a target value; and compensating uniformly for the sensitivity of the touch input device by applying the calculated compensation factor to each corresponding points.

9 Claims, 16 Drawing Sheets

(56) References Cited

U.S. PATENT DOCUMENTS

| | | | | |
|---|---|---|---|---|
| 2013/0342501 A1* | 12/2013 | Molne | ................... | G06F 3/0414 345/174 |
| 2015/0049064 A1* | 2/2015 | Shin | ..................... | G06F 3/0418 345/178 |

FOREIGN PATENT DOCUMENTS

| | | |
|---|---|---|
| KR | 1020110134155 | 12/2011 |
| KR | 1020130078116 | 7/2013 |
| KR | 1020130109321 | 10/2013 |
| WO | WO 2014073586 A1 | 5/2014 |

\* cited by examiner

| A | a | b | c | B |
|---|---|---|---|---|
| d | e | f | g | h |
| i | j | k | l | m |
| n | o | p | q | r |
| C | s | t | u | D |

| A | a | b | c | B |
|---|---|---|---|---|
| d | e | f | g | h |
| i | j | k | l | m |
| n | o | p | q | r |
| C | s | t | u | D |

FIG. 8b

| Set 1 | A | B | C | D | E |
|---|---|---|---|---|---|
| 1 | 962 | 1165 | 1358 | 1573 | 1528 |
| 2 | 1281 | 1522 | 1770 | 1890 | 1946 |
| 3 | 1551 | 2025 | 2242 | 2349 | 2245 |
| 4 | 1883 | 2516 | 2772 | 2784 | 2541 |
| 5 | 2284 | 2827 | 3318 | 3143 | 2713 |
| 6 | 2395 | 2794 | 3184 | 3024 | 2649 |
| 7 | 2151 | 2598 | 2739 | 2742 | 2409 |
| 8 | 1883 | 2240 | 2523 | 2532 | 2226 |
| 9 | 1588 | 1866 | 2319 | 2527 | 1989 |

| Set 2 | A | B | C | D | E |
|---|---|---|---|---|---|
| 1 | 1041 | 1418 | 1595 | 1535 | 1217 |
| 2 | 1494 | 1887 | 1990 | 2014 | 1876 |
| 3 | 1609 | 2010 | 2260 | 2230 | 2093 |
| 4 | 1696 | 2128 | 2355 | 2374 | 2198 |
| 5 | 1811 | 2242 | 2373 | 2411 | 2289 |
| 6 | 1861 | 2265 | 2347 | 2352 | 2220 |
| 7 | 1815 | 2193 | 2225 | 2133 | 2073 |
| 8 | 1625 | 1968 | 2075 | 2100 | 2010 |
| 9 | 1329 | 1593 | 1907 | 2308 | 1960 |

| Set 3 | A | B | C | D | E |
|---|---|---|---|---|---|
| 1 | 824 | 835 | 784 | 745 | 751 |
| 2 | 972 | 1038 | 1008 | 1007 | 939 |
| 3 | 1138 | 1286 | 1277 | 1240 | 1240 |
| 4 | 1334 | 1599 | 1573 | 1643 | 1592 |
| 5 | 1595 | 1917 | 2009 | 2060 | 2016 |
| 6 | 1760 | 2124 | 2262 | 2257 | 2235 |
| 7 | 1680 | 1965 | 2061 | 2124 | 2002 |
| 8 | 1481 | 1646 | 1979 | 2160 | 1898 |
| 9 | 1150 | 1424 | 1859 | 2299 | 1700 |

FIG. 9b

| Set 1 | A | B | C | D | E |
|---|---|---|---|---|---|
| 1 | 3000 | 2987.1245 | 3000 | 2752.0661 | 3000 |
| 2 | 2942.623 | 3012.3193 | 3050.7475 | 2925.7937 | 2908.2734 |
| 3 | 3000 | 2809.6296 | 3000 | 2865.2618 | 3000 |
| 4 | 3054.9655 | 2800.5763 | 3008.658 | 2833.5129 | 2926.8005 |
| 5 | 3000 | 2972.4089 | 3000 | 2878.301 | 3000 |
| 6 | 2777.6618 | 2816.3923 | 2853.4862 | 2772.5694 | 2900.3398 |
| 7 | 3000 | 2823.3256 | 3000 | 2816.1926 | 3000 |
| 8 | 2978.4918 | 2945.4241 | 3007.1344 | 2800.9479 | 2963.6119 |
| 9 | 3000 | 3140.6752 | 3000 | 2557.1824 | 3000 |

| Set 2 | A | B | C | D | E |
|---|---|---|---|---|---|
| 1 | 3000 | 2788.4344 | 3000 | 2747.8827 | 3000 |
| 2 | 2660.6426 | 2585.4531 | 2905.7789 | 2668.1976 | 2646.5885 |
| 3 | 3000 | 2887.3134 | 3000 | 2928.0269 | 3000 |
| 4 | 3024.7642 | 2838.2284 | 2950.9554 | 2848.0413 | 2990.4459 |
| 5 | 3000 | 2799.2864 | 3000 | 2900.4562 | 3000 |
| 6 | 2922.6222 | 2723.1788 | 2938.6451 | 2857.1429 | 29147.2973 |
| 7 | 3000 | 2763.3379 | 3000 | 3022.5035 | 3000 |
| 8 | 2902.1538 | 2772.8659 | 2986.988 | 2916.0714 | 3009.7015 |
| 9 | 3000 | 3047.081 | 3000 | 2513.2149 | 3000 |

| Set 3 | A | B | C | D | E |
|---|---|---|---|---|---|
| 1 | 3000 | 2888.6228 | 3000 | 3090.604 | 3000 |
| 2 | 3027.7778 | 2906.7919 | 3066.9643 | 3017.8749 | 3180.5112 |
| 3 | 3000 | 2816.874 | 3000 | 3044.7581 | 3000 |
| 4 | 3073.0885 | 2823.1707 | 3133.5029 | 2986.3055 | 3067.8392 |
| 5 | 3000 | 2820.0313 | 3000 | 2930.8252 | 3000 |
| 6 | 2791.1932 | 2593.5734 | 2698.939 | 2687.6385 | 2696.6443 |
| 7 | 3000 | 2855.7252 | 3000 | 2869.3053 | 3000 |
| 8 | 2866.3065 | 3075.6379 | 2971.1976 | 2646.5278 | 2925.7113 |
| 9 | 3000 | 3169.5927 | 3000 | 2322.0966 | 3000 |

FIG. 10b

| Set 1 | A | B | C | D | E |
|---|---|---|---|---|---|
| 1 | 3000 | 2987.1245 | 3000 | 2752.0661 | 3000 |
| 2 | 2971.897 | 3053.548 | 3100.565 | 2932.5397 | 2876.1562 |
| 3 | 3048.3559 | 2871.6049 | 3078.5013 | 2876.1175 | 2944.3207 |
| 4 | 3000 | 2775.2385 | 3000 | 2862.6078 | 3000 |
| 5 | 2809.5447 | 2715.069 | 2692.5859 | 2659.72 | 2869.5171 |
| 6 | 3000 | 2995.1682 | 3000 | 2893.3532 | 3000 |
| 7 | 2965.1325 | 2899.3457 | 3171.5955 | 2912.8373 | 3024.9066 |
| 8 | 2958.5767 | 2989.5089 | 3100.2774 | 2853.278 | 2977.0889 |
| 9 | 3000 | 3140.6752 | 3000 | 2557.1824 | 3000 |

| Set 2 | A | B | C | D | E |
|---|---|---|---|---|---|
| 1 | 3000 | 2788.4344 | 3000 | 2747.8827 | 3000 |
| 2 | 2528.7818 | 2470.3233 | 2786.4322 | 2526.5641 | 2469.0832 |
| 3 | 2755.1274 | 2671.1443 | 2789.823 | 2672.1973 | 2681.7965 |
| 4 | 3000 | 2855.4981 | 3000 | 2876.7902 | 3000 |
| 5 | 2946.1623 | 2762.8234 | 2972.1871 | 2836.9971 | 2895.1507 |
| 6 | 3000 | 2786.755 | 3000 | 2912.6272 | 3000 |
| 7 | 2782.9201 | 2656.6347 | 2966.7416 | 3047.5856 | 3087.3131 |
| 8 | 2780.9231 | 2713.4146 | 2969.1566 | 2928.8095 | 3054.7264 |
| 9 | 3000 | 3047.081 | 3000 | 2513.2149 | 3000 |

| Set 3 | A | B | C | D | E |
|---|---|---|---|---|---|
| 1 | 3000 | 2888.6228 | 3000 | 3090.604 | 3000 |
| 2 | 3067.9012 | 2949.422 | 3116.0714 | 3095.8292 | 3294.9947 |
| 3 | 3068.5413 | 2885.6921 | 3077.5255 | 3171.371 | 3173.3871 |
| 4 | 3000 | 2727.0169 | 3000 | 2889.5313 | 3000 |
| 5 | 2909.7179 | 2710.8764 | 2863.3649 | 2789.5631 | 2847.4702 |
| 6 | 3000 | 2840.8764 | 3000 | 2988.7018 | 3000 |
| 7 | 2779.7619 | 2812.4682 | 3097.0403 | 2955.0377 | 3081.9181 |
| 8 | 2741.391 | 3049.8177 | 3021.7281 | 2688.6574 | 2968.9146 |
| 9 | 3000 | 3169.5927 | 3000 | 2322.0966 | 3000 |

FIG. 12b

| Set 1 | A | B | C | D | E |
|---|---|---|---|---|---|
| 1 | 2236.8003 | 2206.3629 | 2382.3688 | 2693.6988 | 2857.7468 |
| 2 | 2402.9513 | 2368.2103 | 2530.3344 | 2659.1276 | 2852.5623 |
| 3 | 2599.7492 | 2731.2626 | 2769.2862 | 2880.5569 | 2900.6578 |
| 4 | 2813.5784 | 2979.1694 | 3069.5783 | 3036.3491 | 2961.6505 |
| 5 | 3038.9813 | 3070.2485 | 3318 | 3168.5452 | 2950.5857 |
| 6 | 3072.7321 | 2993.9546 | 3193.217 | 3111.0104 | 2900.1311 |
| 7 | 2972.2317 | 2991.9883 | 3024.0366 | 3027.6815 | 2849.4494 |
| 8 | 2994.3813 | 3022.0599 | 2987.8101 | 2795.4949 | 2763.1112 |
| 9 | 2942.2122 | 2879.5365 | 2871.6918 | 2669.1305 | 2653.1143 |

| Set 2 | A | B | C | D | E |
|---|---|---|---|---|---|
| 1 | 2420.4876 | 2685.5129 | 2798.143 | 2628.6254 | 2276.0981 |
| 2 | 2802.5052 | 2936.1451 | 2844.8392 | 2833.5889 | 2749.9521 |
| 3 | 2696.9675 | 2711.031 | 2791.5195 | 2734.6283 | 2704.2658 |
| 4 | 2534.163 | 2519.7426 | 2607.8127 | 2589.1856 | 2561.8684 |
| 5 | 2409.6301 | 2434.9123 | 2373 | 2430.5957 | 2489.4548 |
| 6 | 2387.6219 | 2427.0963 | 2353.7941 | 2419.6748 | 2430.4609 |
| 7 | 2507.9501 | 2525.5698 | 2456.5467 | 2355.2315 | 2452.0168 |
| 8 | 2584.1049 | 2655.0955 | 2457.2755 | 2318.5385 | 2494.9926 |
| 9 | 2462.3426 | 2458.2538 | 2361.4991 | 2437.8129 | 2614.461 |

| Set 3 | A | B | C | D | E |
|---|---|---|---|---|---|
| 1 | 1915.9287 | 1581.3845 | 1375.3882 | 1275.7823 | 1104.5601 |
| 2 | 1823.3167 | 1615.1132 | 1441.004 | 1416.7944 | 1376.4419 |
| 3 | 1907.4885 | 1734.5203 | 1577.3321 | 1520.6005 | 1602.1451 |
| 4 | 1993.2626 | 1893.3592 | 1741.8639 | 1791.9259 | 1855.548 |
| 5 | 2122.2308 | 2081.9478 | 2009 | 2076.7429 | 2192.5473 |
| 6 | 2258.0411 | 2276.0055 | 2268.548 | 2321.9413 | 2466.883 |
| 7 | 2355.1135 | 2262.9935 | 2275.4799 | 2345.2938 | 2368.0356 |
| 8 | 2355.1135 | 2220.6740 | 2343.5895 | 2384.7824 | 2355.9681 |
| 9 | 2130.6952 | 2197.4598 | 2302.0591 | 2428.3067 | 2267.6447 |

FIG. 13b

| Set 1 | A | B | C | D | E |
|---|---|---|---|---|---|
| 1 | 3000 | 3140.3509 | 3000 | 2917.9852 | 3000 |
| 2 | 3019.1308 | 3163.2129 | 3053.9373 | 3077.1539 | 3028.0169 |
| 3 | 3000 | 2948.6558 | 3000 | 2952.5249 | 3000 |
| 4 | 3006.1703 | 2952.0016 | 2974.6527 | 5948.9024 | 2963.5048 |
| 5 | 3000 | 3105.7655 | 3000 | 2967.5697 | 3000 |
| 6 | 2934.4633 | 3094.5484 | 2979.1445 | 2927.2013 | 2999.8826 |
| 7 | 3000 | 3006.1623 | 3000 | 2909.8929 | 3000 |
| 8 | 2962.771 | 2930.9906 | 2959.8911 | 3058.0422 | 2987.1728 |
| 9 | 3000 | 3028.5625 | 3000 | 3104.8517 | 3000 |

| Set 2 | A | B | C | D | E |
|---|---|---|---|---|---|
| 1 | 3000 | 2914.8793 | 3000 | 2895.5673 | 3000 |
| 2 | 2739.0431 | 2734.9936 | 2947.2646 | 2797.6959 | 2716.6094 |
| 3 | 3000 | 3036.7526 | 3000 | 3014.5515 | 3000 |
| 4 | 3022.6534 | 3057.1924 | 2970.6041 | 3000.4338 | 3040.9762 |
| 5 | 3000 | 2946.2848 | 3000 | 3000.7796 | 3000 |
| 6 | 3089.4215 | 3011.9716 | 3077.7204 | 3028.6151 | 3049.7126 |
| 7 | 3000 | 2948.5406 | 3000 | 3012.1663 | 3000 |
| 8 | 2885.1146 | 2764.9679 | 2941.0901 | 3197.4422 | 3045.9877 |
| 9 | 3000 | 2943.4562 | 3000 | 3061.7363 | 3000 |

| Set 3 | A | B | C | D | E |
|---|---|---|---|---|---|
| 1 | 3000 | 3121.9322 | 3000 | 3268.5218 | 3000 |
| 2 | 3145.436 | 3146.5925 | 3073.6073 | 3154.7054 | 3276.6059 |
| 3 | 3000 | 3013.6463 | 3000 | 3136.4028 | 3000 |
| 4 | 3032.505 | 3016.8805 | 3088.3573 | 3089.2842 | 3067.5781 |
| 5 | 3000 | 2976.4657 | 3000 | 3034.7141 | 3000 |
| 6 | 2951.8766 | 2876.1306 | 2832.9662 | 2857.0046 | 2795.7505 |
| 7 | 3000 | 3046.9961 | 3000 | 2969.8937 | 3000 |
| 8 | 2835.5981 | 3049.6285 | 2929.8256 | 2897.5031 | 2951.4493 |
| 9 | 3000 | 3025.8263 | 3000 | 2822.7719 | 3000 |

FIG. 14b

| Set 1 | A | B | C | D | E |
|---|---|---|---|---|---|
| 1 | 3000 | 3140.3509 | 3000 | 2917.9852 | 3000 |
| 2 | 3032.5954 | 3192.5996 | 3096.1583 | 3104.6762 | 3041.8772 |
| 3 | 3024.8906 | 2999.6168 | 3077.1559 | 3003.3382 | 3027.2608 |
| 4 | 3000 | 2962.1461 | 3000 | 2979.5135 | 3000 |
| 5 | 2905.4031 | 2967.7823 | 2831.2818 | 2869.9079 | 2979.9752 |
| 6 | 3000 | 3139.3007 | 3000 | 3937.9593 | 3000 |
| 7 | 3057.5262 | 3065.8212 | 3061.5125 | 2924.9332 | 2966.6807 |
| 8 | 2991.3213 | 2960.5233 | 2991.0203 | 3066.187 | 2969.9926 |
| 9 | 3000 | 3028.5625 | 3000 | 3014.8517 | 3000 |

| Set 2 | A | B | C | D | E |
|---|---|---|---|---|---|
| 1 | 3000 | 2914.8793 | 3000 | 2895.5673 | 3000 |
| 2 | 2631.6234 | 2653.0087 | 2883.8532 | 2702.9615 | 2586.9776 |
| 3 | 2776.7534 | 2859.1672 | 2870.7549 | 2818.2264 | 2736.3564 |
| 4 | 3000 | 3061.0125 | 3000 | 2994.9656 | 3000 |
| 5 | 3063.8218 | 3044.2754 | 3136.2875 | 3071.4495 | 3008.086 |
| 6 | 3000 | 2930.3015 | 3000 | 2965.8459 | 3000 |
| 7 | 2885.8574 | 2832.3655 | 2877.6523 | 3087.6944 | 3048.667 |
| 8 | 2829.7253 | 2709.7141 | 2879.9344 | 3177.9018 | 3069.9021 |
| 9 | 3000 | 2832.3655 | 3000 | 3061.7363 | 3000 |

| Set 3 | A | B | C | D | E |
|---|---|---|---|---|---|
| 1 | 3000 | 3121.9322 | 3000 | 3268.5218 | 3000 |
| 2 | 3194.7934 | 3194.1291 | 3117.7153 | 3231.6998 | 3388.9321 |
| 3 | 3094.3589 | 3102.1746 | 3080.5916 | 3279.8792 | 3193.0044 |
| 4 | 3000 | 2959.1267 | 3000 | 3011.3511 | 3000 |
| 5 | 3004.836 | 2976.197 | 2994.3344 | 3002.1203 | 2943.4469 |
| 6 | 3000 | 2983.2457 | 3000 | 3046.221 | 3000 |
| 7 | 2863.2522 | 2979.6667 | 3005.588 | 2984.8213 | 3024.199 |
| 8 | 2768.2027 | 3015.3223 | 2932.5385 | 2904.8433 | 2963.6107 |
| 9 | 3000 | 3025.8263 | 3000 | 2822.7719 | 3000 |

US 10,331,256 B2

METHOD FOR CORRECTING SENSITIVITY OF TOUCH INPUT DEVICE THAT DETECTS TOUCH PRESSURE AND COMPUTER-READABLE RECORDING MEDIUM

CROSS REFERENCE TO RELATED APPLICATIONS

This application is a U.S. national stage application under 35 U.S.C. § 371 of PCT Application No. PCT/KR2016/005504, filed May 25, 2016, which claims priority to Korean Patent Application No. 10-2015-0076459, filed May 29, 2015, the entireties of which are incorporated herein by reference.

The present disclosure relates to a sensitivity compensation method of a touch input device sensing a touch pressure and a computer-readable recording medium, and more particularly to a sensitivity compensation method of a touch input device sensing a touch pressure, which is capable of uniformly compensating for a touch pressure sensitivity for a touch sensor panel, and a computer-readable recording medium recording a program performing the method.

BACKGROUND ART

Various kinds of input devices for operating a computing system, for example, a button, key, joystick and touch screen, etc., are being developed and used. The touch screen has a variety of advantages, e.g., ease of operation, miniaturization of products and simplification of the manufacturing process, the most attention is paid to the touch screen.

The touch screen may constitute a touch surface of a touch input device including a touch sensor panel which may be a transparent panel including a touch-sensitive surface. The touch sensor panel is attached to the front side of the touch screen, and then the touch-sensitive surface may cover the touch screen. The touch screen allows a user to operate the computing system by touching the touch screen with his/her finger, etc. Accordingly, the computing system recognizes whether or not the touch has occurred on the touch screen and a touch position on the touch screen and performs arithmetic operations, thereby performing actions according to the user's intention.

Meanwhile, there is a requirement for a device for sensing even the touch pressure for convenience of operation and a research on the device is being conducted. However, in the sensing of the touch pressure, there is a problem that the touch pressure cannot be sensed with a uniform sensitivity on the display surface. Furthermore, due to the difference in the manufacturing process or manufacturing environment, different sensitivities may be shown for each manufactured product. For the purpose of compensating this, therefore, the touch pressure device needs to compensate for the sensitivity.

DISCLOSURE

Technical Problem

The present invention is designed in consideration of the above-described problems. The object of the present invention is to provide a touch input device sensing a touch pressure, in other words, is to provide a sensitivity compensation method of a touch input device sensing a touch pressure, which is capable of compensating for the touch pressure sensitivity of the touch input device such that the touch pressure is sensed with a uniform sensitivity on the front side of the display, and is to provide a computer-readable recording medium.

Technical Solution

One embodiment is a sensitivity compensation method of a touch input device sensing a touch pressure. The method includes: defining a plurality of reference points spaced apart from each other on a touch sensor panel; generating a reference data corresponding to a capacitance change amount sensed by applying a predetermined pressure to the plurality of reference points; generating, on the basis of the reference data, an interpolated data corresponding to a capacitance change amount for a random point present between the plurality of reference points; calculating, on the basis of the generated reference data and interpolated data, with respect to the reference point and random point respectively, a compensation factor for compensating a sensitivity of the touch input device to a target value; and compensating uniformly for the sensitivity of the touch input device by applying the calculated compensation factor to each corresponding point.

The compensation factor may correspond to a value obtained by dividing the target value by the capacitance change amount recorded in the reference data and in the interpolated data and may be calculated for the reference point and the random point respectively.

In the defining the reference point, the reference point is located at an intersection of n number of horizontal lines parallel to each other and m number of vertical lines parallel to each other on the touch sensor panel, so that n x m (n and m are natural numbers equal to or greater than 2) number of the reference points may be defined.

The interpolated data may be generated based on the capacitance change amount detected at four reference points surrounding the random point and on a spaced distance between the random point and four reference points.

Defining, before defining the reference point, a plurality of position points on the touch sensor panel comprised in a plurality of the touch input devices; sensing the capacitance change amount by applying the same pressure to the plurality of position points; generating an average value data by calculating an average value of the capacitance change amount sensed at the same position between the plurality of touch input devices; calculating, on the basis of the average value data, a first compensation factor at the plurality of position points; and compensating uniformly the sensitivity of the touch input device by applying the first compensation factor to the plurality of position points may be performed in advance.

The first compensation factor may correspond to an inverse number of the average value.

The plurality of position points may be defined at the same position as those of the reference point and the random point.

Another embodiment is a computer-readable recording medium recording a program. The program performs: defining a plurality of reference points spaced apart from each other on a touch sensor panel; generating a reference data corresponding to a capacitance change amount sensed by applying a predetermined pressure to the plurality of reference points; generating, on the basis of the reference data, an interpolated data corresponding to a capacitance change amount for a random point present between the plurality of reference points; calculating, on the basis of the generated reference data and interpolated data, with respect to the reference point and random point respectively, a compensation factor for compensating a sensitivity of the touch input device to a target value; and compensating uniformly for the sensitivity of the touch input device by applying the calculated compensation factor to each corresponding point.

The program recorded in the computer-readable recording medium may further perform: defining, before defining the reference point, a plurality of position points on the touch sensor panel comprised in a plurality of the touch input devices; sensing the capacitance change amount by applying the same pressure to the plurality of position points; generating an average value data by calculating an average value of the capacitance change amount sensed at the same position between the plurality of touch input devices; calculating, on the basis of the average value data, a first compensation factor at the plurality of position points; and compensating uniformly the sensitivity of the touch input device by applying the first compensation factor to the plurality of position points.

Advantageous Effects

Through the sensitivity compensation method of the input device and the computer-readable recording medium, it is possible to compensate for the sensitivity of the touch input device such that the touch pressure is sensed with a uniform sensitivity on the front side of the display.

DESCRIPTION OF DRAWINGS

FIG. 8b is a data showing the capacitance change amount sensed by applying the same pressure to the plurality of position points;

FIG. 9b is a data showing the result obtained by applying the sensitivity compensation method according to the embodiment of the present invention;

FIG. 10b is a data showing the result obtained by applying the sensitivity compensation method according to the embodiment of the present invention;

FIG. 12b is a data showing the result obtained by applying the first compensation step in the sensitivity compensation method according to the embodiment of the present invention;

FIG. 13b is a data showing the result obtained by applying the practical compensation step after the first compensation step in the sensitivity compensation method according to the embodiment of the present invention;

FIG. 14b is a data showing the result obtained by applying the practical compensation step after the first compensation step in the sensitivity compensation method according to the embodiment of the present invention.

MODE FOR INVENTION

Figure 1:
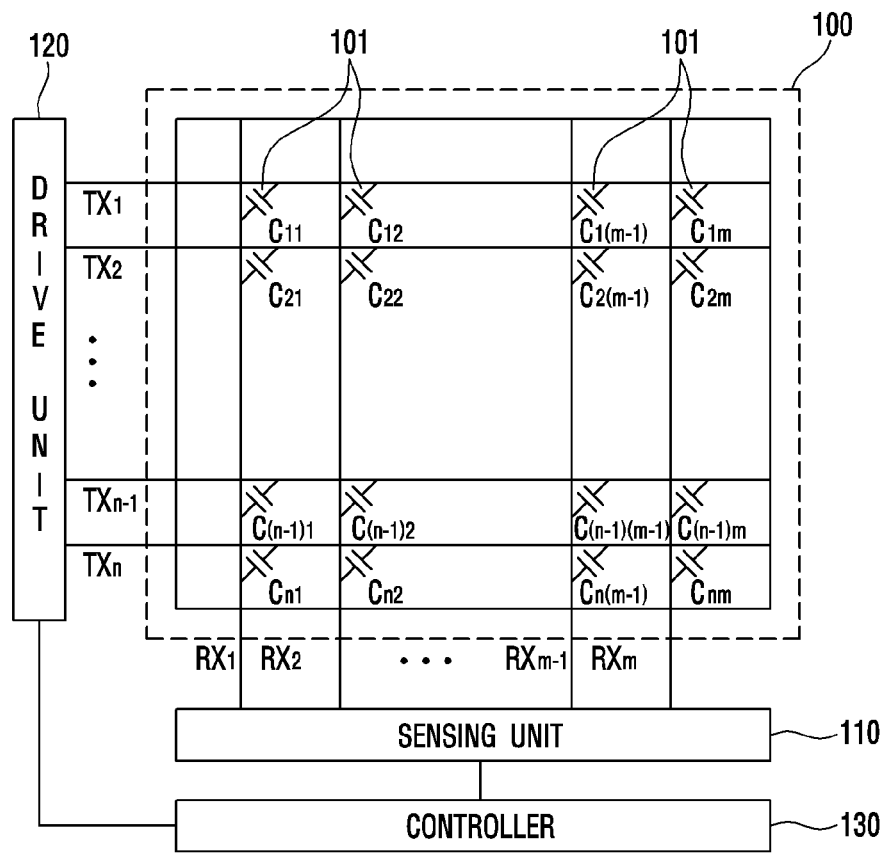
FIG. 1 is a schematic view showing a configuration of a touch input device to which a sensitivity compensation method of an embodiment of the present invention is applied.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

FIG. 1 is a schematic view showing a configuration of a touch input device to which a sensitivity compensation method of the present invention is applied.

Referring to FIG. 1, a touch sensor panel 100 according to the embodiment of the present invention may include a plurality of drive electrodes TX1 to TXn and a plurality of receiving electrodes RX1 to RXm. The touch sensor panel 100 may include a drive unit 120 which applies a drive signal to the plurality of drive electrodes TX1 to TXn for the purpose of the operation of the touch sensor panel 100, and a sensing unit 110 which detects the touch and a touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitudes of the values may be different from each other.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment which is one component of the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh or nano silver.

The drive unit 120 according to the embodiment which is one component of the touch input device 100 may apply a drive signal to the drive electrodes TX1 to TXn. In the touch input device 1000 according to the embodiment of the present invention, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the drive signal has been applied, thereby detecting whether or not the touch has occurred and the touch position. For example, the sensing signal may be a signal coupled by the capacitance (Cm) 101 generated between the receiving electrode RX and the drive electrode TX to which the drive signal has been applied.

As such, the process of sensing the drive signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the drive signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether or not the touch has occurred on the touch sensor panel 100 of the touch input device 1000 according to the embodiment and the touch position. The touch input device 1000 according to the embodiment may further include the controller 130. In the embodiment of the present invention, the touch detection device according to the embodiment may be integrated and implemented on a touch sensing integrated circuit (IC) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and the touch position. For example, the sensing unit 110 is able to sense whether the touch has occurred on the surface of the touch sensor panel 100 comprised of a two-dimensional plane consisting of a first axis and a second axis and/or the touch position.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and the touch position may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

In the touch input device 1000 according to the embodiment of the present invention, the touch sensor panel 100 for detecting the touch position may be positioned outside or inside a display module 200.

The display module 200 of the touch input device 1000 according to the embodiment of the present invention may be a liquid crystal display (LCD). Here, the display module 200 may have any one of an In Plane Switching (IPS) type, a Vertical Alignment (VA) type, and a Twisted Nematic (TN) type. Also, the display module 200 of the touch input device 1000 according to the embodiment of the present invention may be a display panel included in a plasma display panel (PDP), an organic light emitting diode (OLED), etc. Accordingly, a user may perform the input operation by touching the touch surface while visually identifying an image displayed on the display panel.

Here, the display module 200 may include a control circuit which receives an input from an application processor (AP) or a central processing unit (CPU) on a main board for the operation of the touch input device 100 and displays the contents that the user wants on the display panel.

Here, the control circuit for the operation of the display panel 200 may include a display panel control IC, a graphic controller IC, and other circuits required to operate the display panel 200.

Figure 2:
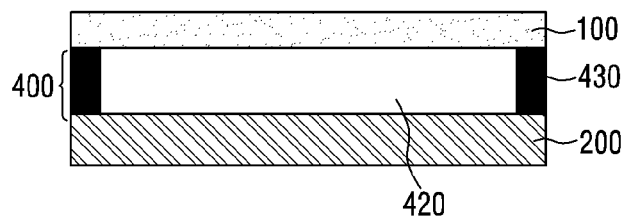
FIG. 2 is a cross sectional view of the touch input device configured to detect a touch position and a touch pressure, to which the sensitivity compensation method according to the embodiment of the present invention is applied.

FIG. 2 is a cross sectional view of the touch input device configured to detect a touch position and a touch pressure, to which the sensitivity compensation method according to the embodiment of the present invention is applied.

In the touch input device 1000 including the display module 200, a pressure detection module 400 and the touch sensor panel 100 which detects the touch position may be attached to the front side of the display module 200. Accordingly, it is possible to protect a display screen of the display module 200 and to increase a touch detection sensitivity of the touch sensor panel 100.

Here, the pressure detection module 400 may operate separately from the touch sensor panel 100 which detects the touch position. For example, the pressure detection module 400 may detect only the pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 2 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the touch sensor panel 100.

As shown in FIG. 2, the touch sensor panel 100 is disposed apart from the display module 200, i.e., the reference potential layer. Here, depending on a method for adhering the touch sensor panel 100 to the display module 200, the spacer layer 420 between the touch sensor panel 100 and the display module 200 may be implemented in the form of an air gap.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 2, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be fully laminated by means of an adhesive like an optically clear adhesive (OCA).

In the description related to FIGS. 1 and 2, the configuration of the touch input device 1000 to which the sensitivity compensation method according to the embodiment of the present invention is applied has been specified in order to describe the principle of detecting the touch position and the touch pressure. However, the sensitivity compensation method according to the embodiment of the present invention can be applied to any touch input device which is capable of the touch pressure and has a different structure from those shown in FIGS. 1 and 2.

As described above, the pressure detection is made based on the distance change between the electrodes, furthermore, the capacitance change between the electrodes by the bending due to the application of a predetermined pressure to the touch sensor panel 100. However, how much the touch sensor panel 100 is bent cannot be the same at all the positions. Particularly, the edge of the touch sensor panel 100 is fixed to the case and is less bent than the central portion of the touch sensor panel 100 even if the same pressure is applied.

Figure 3A:
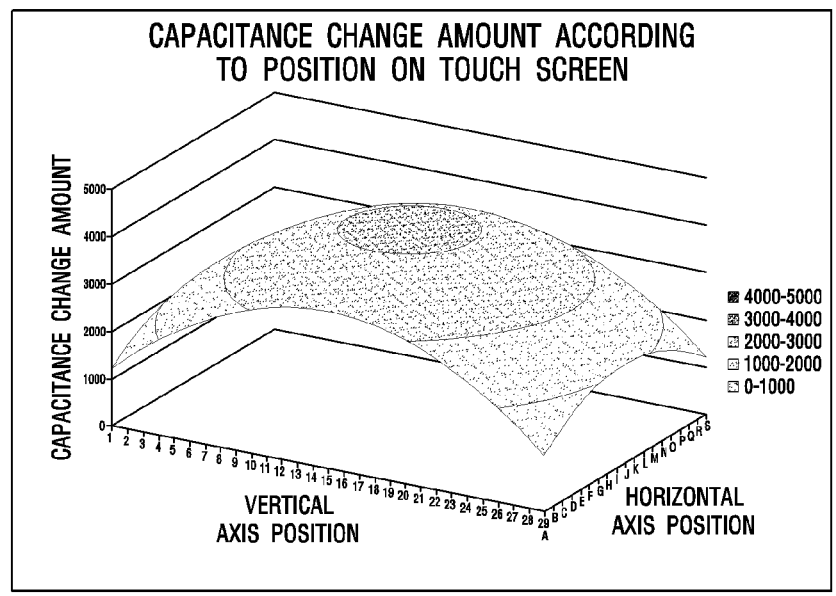
FIG. 3a is a graph showing a capacitance change amount which is sensed when the same pressure is applied to each position of a touch sensor panel.

FIG. 3a is a graph showing a capacitance change amount which is sensed when the same pressure is applied to each position of such a touch sensor panel 100. In the graph of FIG. 3a, an x-axis and a y-axis represent a horizontal axis position and a vertical axis position respectively. A z-axis represents the sensed capacitance change amount. As shown in FIG. 3a, when the same pressure is applied, the capacitance change amount varies depending on the position. The central portion of the touch sensor panel 100 has a large capacitance change amount. The capacitance change amount decreases toward the edge of the touch sensor panel 100.

Figure 3B:
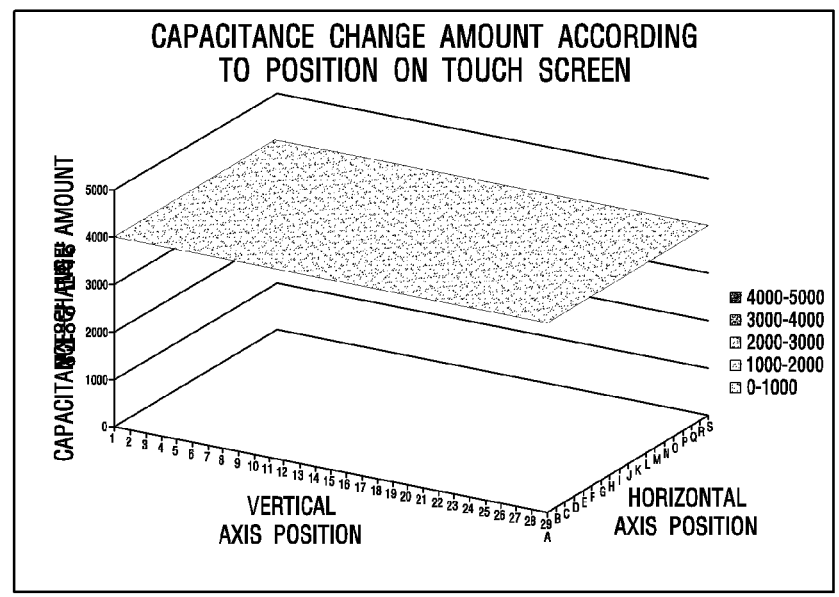
FIG. 3b is a graph showing a preferable capacitance change amount.

This means that the edge of the touch sensor panel 100 has a lower sensitivity than that of the central portion of the touch sensor panel 100. This is an unavoidable problem in the manufacturing process and structure of the touch sensor panel 100. Ideally, as shown in FIG. 3b, it is preferable for all the areas of the touch sensor panel 100 to have the same sensitivity. Therefore, the present invention provides the sensitivity compensation method of the touch input device which allows the capacitance change amount sensed at all the positions of the touch sensor panel 100 to be, as shown in FIG. 3b, uniform through the sensitivity compensation.

Figure 4:
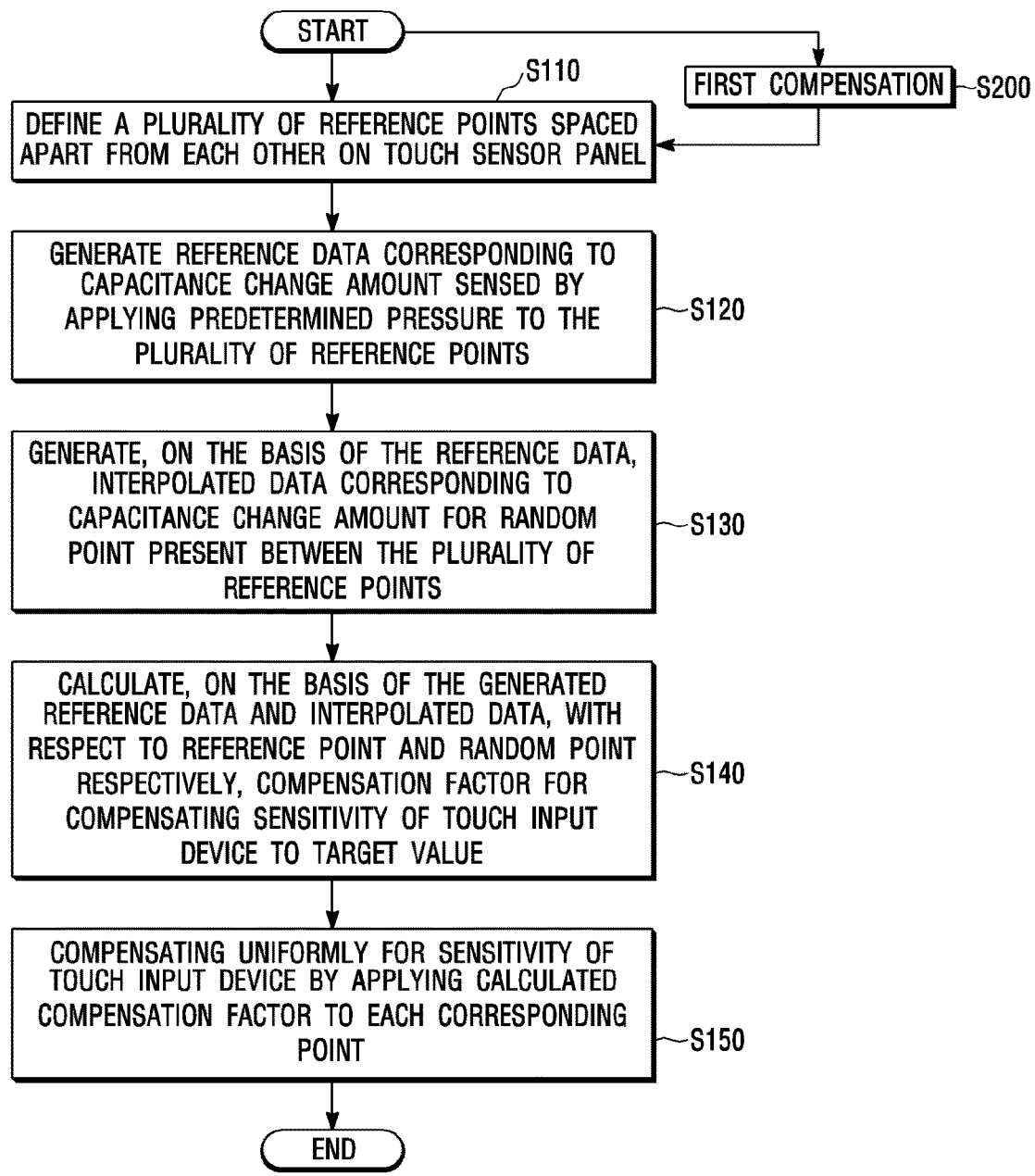
FIG. 4 is a flowchart showing the sensitivity compensation method of the touch input device according to the embodiment of the present invention.

FIG. 4 is a flowchart showing the sensitivity compensation method of the touch input device according to the embodiment of the present invention.

First, a plurality of reference points are defined on the touch sensor panel 100 included in the touch input device 1000 (S110). After a predetermined pressure is applied to the defined reference point, a reference data is generated which corresponds to a sensed capacitance change amount (S120).

When the reference data is generated, the capacitance change amount for a random point present between the defined reference points is calculated by interpolation, and then an interpolated data is generated (S130).

The generated reference data and interpolated data have information on the capacitance change amount for all the positions of the touch sensor panel 100. Based on the generated reference data and interpolated data, a compensation factor for setting the sensitivity of the touch input device to a target value is calculated (S140).

Lastly, the calculated compensation factor is applied to each corresponding point, so that the sensitivity of the touch input device 1000 is uniformly compensated (S150).

Hereafter, each step which is shown in the flowchart of FIG. 4 and is included in the sensitivity compensation method according to the embodiment of the present invention will be described in detail.

Reference Point Definition Step (S110)

The plurality of the reference points are defined on the touch sensor panel 100 included in the touch input device 1000. Imaginary horizontal and vertical lines are set on the touch sensor panel 100, and then the reference point may be defined as being located at the intersection of the horizontal line and vertical lines.

Here, it is preferable that at least two horizontal lines and at least two vertical lines should be provided. Therefore, at least four reference points can be defined.

Figure 5A:
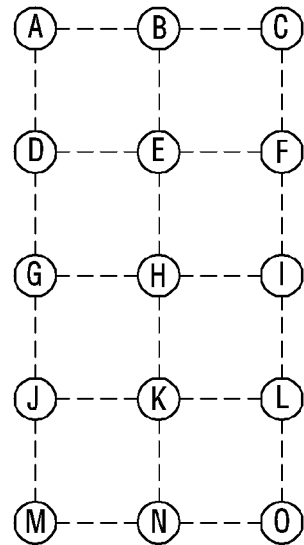
FIGS. 5a and 5b are views showing an example of a reference point defined in the sensitivity compensation method of the touch input device according to the embodiment of the present invention.
Figure 5B:
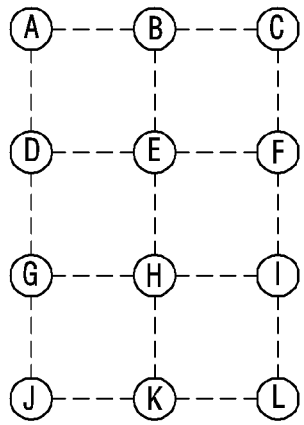

The reference points defined in this way are shown in FIGS. 5a and 5b. In FIGS. 5a and 5b, dotted lines correspond to the above-described horizontal line or vertical line. Circles marked with alphabets represent the defined reference points.

FIG. 5a shows that a total of 15 reference points from "A" to "O" are defined at the intersections of five horizontal lines and three vertical lines. FIG. 5b shows that a total of 12 reference points from "A" to "L" are defined at the intersections of four horizontal lines and three vertical lines.

Needless to say, a larger or smaller number of the reference points can be defined. Hereafter, for convenience of description and understanding, the following description will be provided by assuming that a total of 15 reference points and a total of 12 reference points are defined.

Reference Data Generation Step (S120)

When the reference data is defined, a predetermined pressure is applied to the position where the reference data exists. Here, it is preferable that the pressure to be applied should have a similar magnitude to that of a human finger.

When the pressure is applied to each reference point, the capacitance change amount for the applied pressure is detected. Since the detection of the capacitance change amount has been described above, the description thereof will be omitted.

The detected capacitance change amount for each reference point is used to generate the reference data. For example, when the 15 reference points are, as shown in FIG. 5a, defined, the capacitance change amounts for the reference points from "A" to "O" are recorded in the reference data. When the 12 reference points are, as shown in FIG. 5b, defined, the capacitance change amounts for the reference points from "A" to "L" are recorded in the reference data. The reference data includes the capacitance change amount and position of each reference point.

Interpolated Data Generation Step (S130)

While the reference data is generated by directly applying the pressure to the defined reference point and by directly detecting the capacitance change amount for the applied pressure, the interpolated data is calculated based on the capacitance change amount detected at the defined reference point.

The interpolated data may be generated based on the capacitance change amount detected at four reference points surrounding the random point and on a spaced distance between the random point and four reference points.

Figure 6:
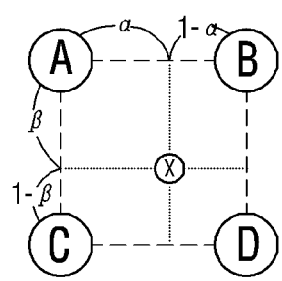
FIGS. 6, 7a, and 7b are views for describing a method for generating interpolated data in the sensitivity compensation method of the touch input device according to the embodiment of the present invention.

Regarding the interpolated data generation, an example of a method for calculating the capacitance change amount for the random point is shown in FIG. 6.

The capacitance change amount "X" of a random point "x" may be defined by the following equation 1.

$$X = A + (B-A) \times \alpha + \{C + (D-C) \times \alpha - A + (A-B) \times \alpha\} \times \beta \quad \text{[Equation 1]}$$

Here, A, B, C, and D represent the capacitance change amount sensed at the reference points "A", "B", "C", and "D". $\alpha$ and $\beta$ represent a distance ratio between the reference points.

Figures 7A, 7B, 8A:
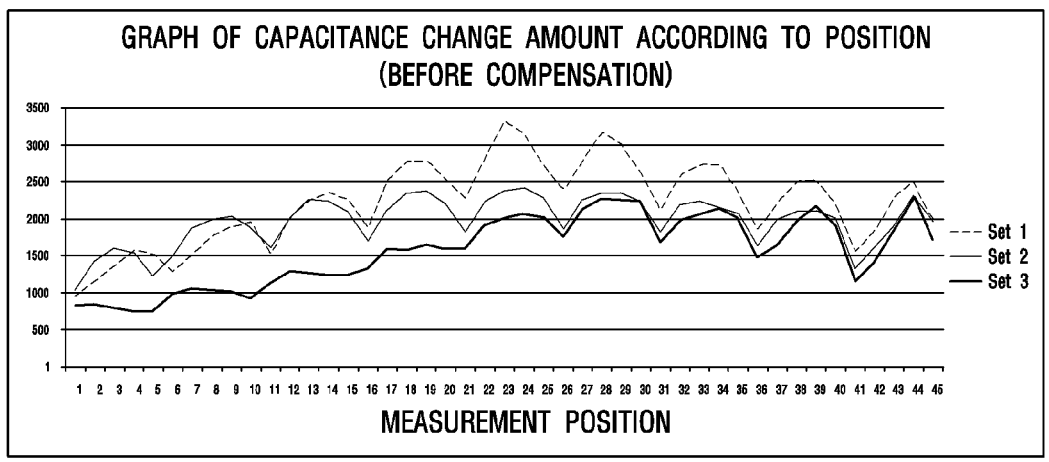
FIG. 8a is a graph showing a capacitance change amount sensed by applying the same pressure to a plurality of position points.

FIGS. 7a and 7b are views showing that more random points are set between the reference points "A" to "D" and the capacitance change amount for them are calculated by the above method.

FIG. 7a shows that a total of 21 random points from "a" to "u" are set between the reference points "A" to "D". Here, it means that the darker area has a larger capacitance change amount. For the 21 random points set above, the capacitance change amount may be calculated based on the equation 1. For the calculated capacitance change amount, the points are, as shown in FIG. 7a, marked with brightness varying in accordance with the size of the capacitance change amount, so that what is shown in FIG. 7b is obtained.

Compensation Factor Calculation Step (S140)

For the entire surface of the touch sensor panel 100, the reference data and the interpolated data have information on the capacitance change amount corresponding to each position.

Here, a target value for setting a uniform sensitivity for the entire surface of the touch sensor panel 100 may be predetermined. Alternatively, the target value can be set after the reference data and the interpolated data are generated.

The target value is used together with the reference data and the interpolated data to calculate the compensation factor at the reference point and random point. The compensation factor may be an inverse number of the capacitance change amount recorded in each data. Unlike this, the compensation factor may be a value obtained by multiplying the inverse number of the capacitance change amount recorded in each data by the target value.

For example, when the target value is 3000 and the capacitance change amount (detected by directly applying the pressure) at the reference point "A" is 962, the compensation factor at the reference point "A" may be 1/962 or may be 3000/962 obtained by multiplying 1/962 by the target value. Also, when the target value is 3000 and the capacitance change amount (calculated by the equation 1) at the random point "x" is 1024, the compensation factor at the random point "x" may be 1/1024 or may be 3000/1024 obtained by multiplying 1/1024 by the target value.

As such, the compensation factors at the defined reference point, the random set point, and all the points are calculated.

Sensitivity Compensation Step (S150)

The compensation factor calculated for all the points (reference point and random point) present in the touch sensor panel 100 is used to uniformly compensate for the sensitivity of the touch input device 1000.

That is, by multiplying the capacitance change amount corresponding to the position of each point by the compensation factor, the capacitance change amount finally sensed come to have a uniform value as a whole.

FIGS. 9a, 9b, 10a and 10b show graphs and data which show a result obtained by applying the sensitivity compensation method according to the embodiment of the present invention.

A total of three sets of the touch input devices 1000 are assumed. A total of 45 points including the reference points and random points are set. Here, when the 15 reference points are provided as shown in FIG. 5a, 30 random points may be set. When the 12 reference points are provided as shown in FIG. 5b, 33 random points may be set. Here, FIGS. 8a and 8b show the sensitivity compensation method sensed by applying the same pressure to all of the points as comparison targets.

FIGS. 8a and 8b show the capacitance change amount of the touch input device when the compensation is not made. FIG. 8a can be understood as a graph corresponding to FIG. 3.

Here, the horizontal axis of FIG. 8a represents the measurement position. The numbers of the horizontal axis are set in the manner of sequentially scanning each row of FIG. 8b. For example, (1,A), (1,B), (1,C), (1,D), and (1,E) of FIG. 8b correspond to 1, 2, 3, 4, and 5 listed on the horizontal axis of FIG. 8a respectively. Also, (2,A), (2,B), (2,C), (2,D), and (2,E) of FIG. 8b correspond to 6, 7, 8, 9, and 10 listed on the horizontal axis of FIG. 8a respectively. The position of each cell of FIG. 8b may correspond to the position of the touch sensor panel 100.

Referring to FIGS. 8a and 8b, it can be seen that the capacitance change amount for each point is not uniform even though the same pressure is applied.

Figure 9A:
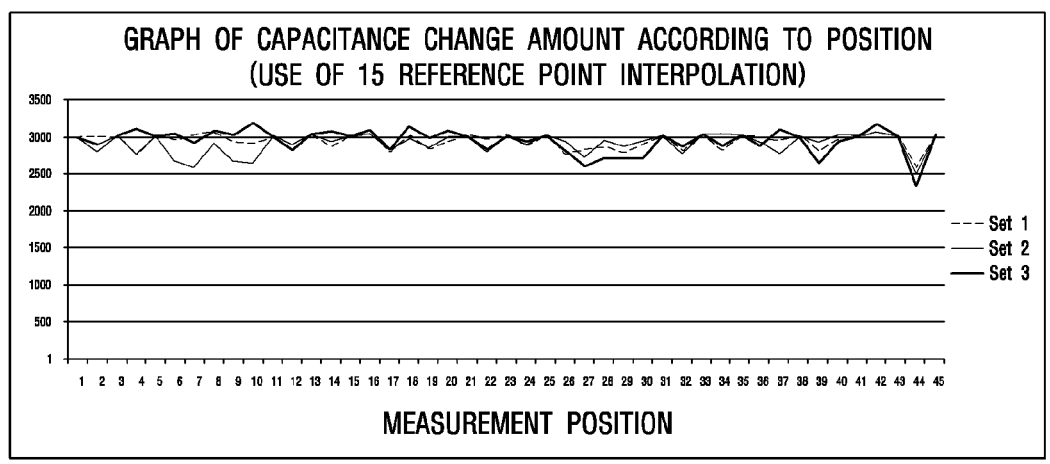
FIG. 9a is a graph showing a result obtained by applying the sensitivity compensation method according to the embodiment of the present invention.

FIGS. 9a and 9b show the capacitance change amount after the sensitivity compensation is made according to the embodiment of the present invention. Particularly, as shown in FIG. 5a, FIGS. 9a and 9b show that the 15 reference points are defined and then the compensation factor is finally calculated.

Referring to FIGS. 9a and 9b, it can be understood that when the compensation factor calculated for each of the 45 points is applied, the overall uniform capacitance change amount for the all the 45 points is sensed. This means that the sensitivity of the touch input device 1000 becomes uniform.

Referring to the data of FIG. 9b, it can be seen that cells of (1,A), (1,C), (1,E), (3,A), (3,C), (3,E), (5,A), (5,C), (5,E), (7,A), (7,C), (7,E), (9,A), (9,C), and (9,E) have all the target value of 3000. The cell corresponds to the reference point at which the capacitance change amount has been directly sensed. The cell has the target value of 3000 as it is because the compensation factor obtained by multiplying the inverse number of the capacitance change amount by the target value is multiplied by the capacitance change amount again.

However, there may be a slight error between the target value and the capacitance change amount of the remaining points because the remaining points are based on the capacitance change amount value calculated based on the reference point. However, this corresponds to a sensitivity which is difficult for the user to recognize, so that it is possible to ensure an ideal pressure touch sensitivity shown in FIG. 3b.

Figure 10A:
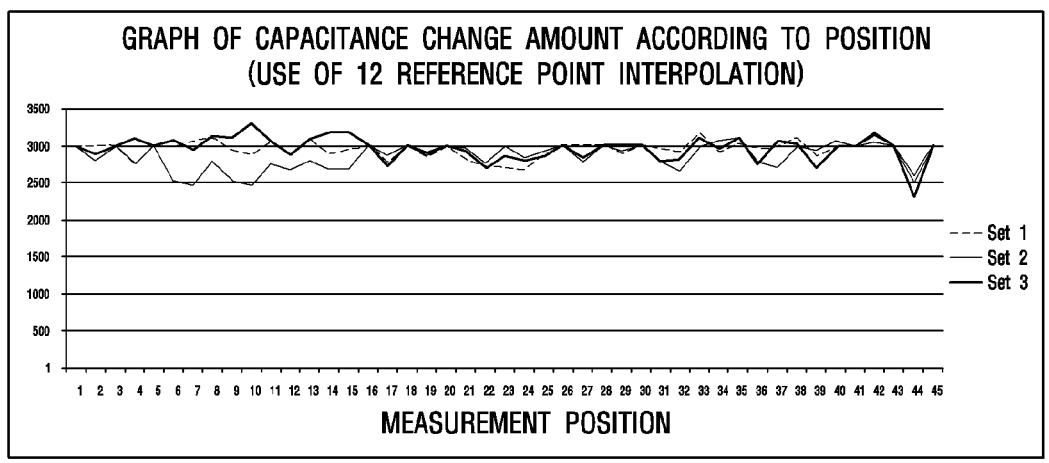
FIG. 10a is a graph showing a result obtained by applying the sensitivity compensation method according to the embodiment of the present invention.

FIGS. 10a and 10b show the capacitance change amount after the sensitivity compensation is made according to the embodiment of the present invention. Particularly, as shown in FIG. 5b, FIGS. 10a and 10b show that the 12 reference points are defined and then the compensation factor is finally calculated.

Referring to FIGS. 10a and 10b, it can be understood that when the compensation factor calculated for each of the 45 points is applied, the overall uniform capacitance change amount for the all the 45 points is sensed. This means that the sensitivity of the touch input device 1000 becomes uniform.

Referring to the data of FIG. 9b, it can be seen that cells of (1,A), (1,C), (1,E), (4,A), (4,C), (4,E), (6,A), (6,C), (6,E), (9,A), (9,C), and (9,E) have all the target value of 3000. The cell corresponds to the reference point at which the capacitance change amount has been directly sensed. The cell has the target value of 3000 as it is because the compensation factor obtained by multiplying the inverse number of the capacitance change amount by the target value is multiplied by the capacitance change amount again.

However, even in this case, there may be a slight error between the target value and the capacitance change amount of the remaining points because the remaining points are based on the capacitance change amount value calculated based on the reference point. However, this corresponds to a sensitivity which is difficult for the user to recognize, so that it is possible to ensure an ideal pressure touch sensitivity shown in FIG. 3b.

Figure 11:
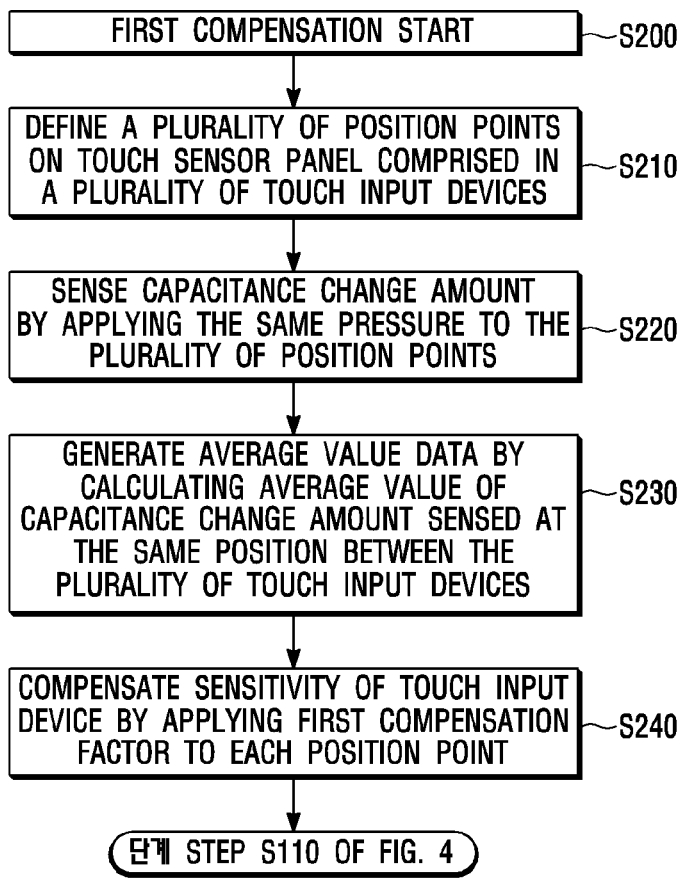
FIG. 11 is a flowchart showing a first compensation step which is applied to the sensitivity compensation method according to the embodiment of the present invention.

Meanwhile, in the sensitivity compensation method according to the embodiment of the present invention, a first compensation step S200 of FIG. 4 may be performed in advance. FIG. 11 is a flowchart showing the first compensation step (a preliminary compensation step) which is applied to the sensitivity compensation method according to the embodiment of the present invention.

In the first compensation step, first, a plurality of position points are defined on the touch sensor panel included in a plurality of the touch input devices (S210). While the sensitivity compensation can be made only by one touch input device 100 in the method of FIG. 4 described above, at least two touch input devices 100 are required to perform the first compensation.

When the plurality of the position points are defined, the capacitance change amount is sensed by applying the same pressure (S220). Here, the step S220 is performed on the plurality of the touch input devices, and the capacitance change amount at mutually corresponding is extracted in each touch input device, and then an average value thereof is calculated. By performing such a process on all the position points, the average value of the capacitance change amount for all the position points can be calculated and an average value data is generated based on the average value (S230).

The generated average value data is used to calculate a first compensation factor for the first compensation (S240). Here, the first compensation factor may be an inverse number of the average value or may be a value obtained by multiplying the inverse number by the target value.

The sensitivity of the touch input device is compensated by applying the first calculated compensation factor to the plurality of the position points (S250).

Hereafter, each step for performing the first compensation will be described in more detail.

Position Point Definition Step (S210)

In the first compensation, the position point may correspond to the reference point and random point which are defined in the manner of FIG. 4. That is, when the 15 reference points and 30 random points are defined in the manner of FIG. 4, the position point may be also disposed in the areas where the 15 reference points and 30 random points are located. Also, when the 12 reference points and 33 random points are defined, the position point may be also disposed in the areas where the 12 reference points and 33 random points are located.

Capacitance Change Amount Sensing Step (S220)

The same pressure is applied to the plurality of the position points. Here, it is preferable that the pressure which is applied to each of the position points should have a similar magnitude to that of a human finger.

When the same pressure is applied to each of the position points, the capacitance change amount for the applied pressure is detected. Since the detection of the capacitance change amount has been described above, the description thereof will be omitted.

Average Data Generation Step (S230)

For example, as shown in FIGS. 8a and 8b, in the three touch input devices, the capacitance change amount for each position point may be detected. Three data shown in FIG. 8b represent the capacitance change amounts detected from the three touch input devices respectively. The average value of the capacitance change amounts (capacitance change amounts recorded in the same cell) corresponding to the same position point is calculated and then the average value data is generated.

First Compensation Factor Calculation Step (S240)

When the average value data is generated, the first compensation factor for each position point is calculated based on the average value data. The first compensation factor may be an inverse number of the average value calculated for each position point or may have a value obtained by multiplying the inverse number by the target value.

Sensitivity Compensation Step of Touch Input Device (S240)

The first calculated compensation factor is used to primarily compensate for the sensitivity of the touch input device. The compensation of the primarily compensated sensitivity of the touch input device is made again by performing again the substantive compensation steps (S110 to S150 of FIG. 4).

Figure 12A:
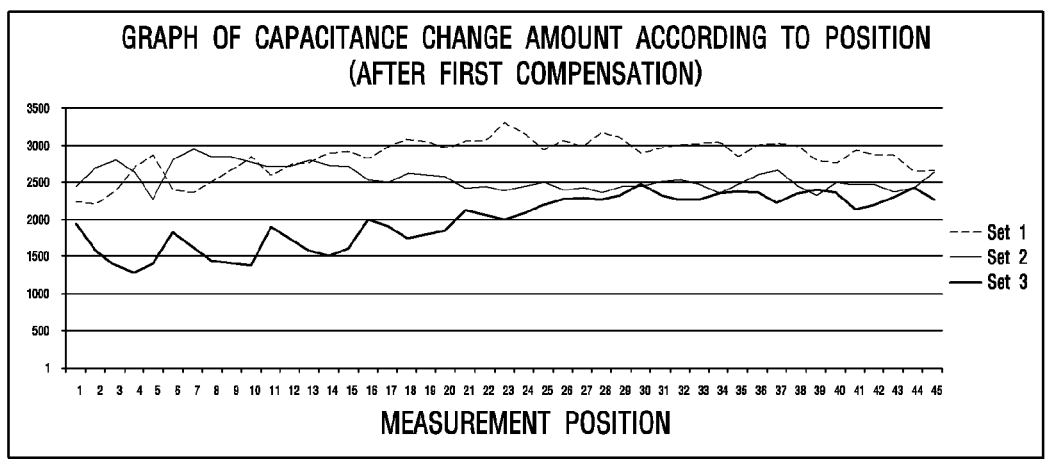
FIG. 12a is a graph showing a result obtained by applying the first compensation step in the sensitivity compensation method according to the embodiment of the present invention.

FIGS. 12a and 12b are a graph and data showing the sensitivity of the touch input device, to which the first compensation has been applied. Through the first compensation, a graph which is much more uniform than the graph before the compensation (see FIG. 8a) can be obtained. This means that the sensitivity of the touch input device becomes uniform through the first compensation.

Figure 13A:
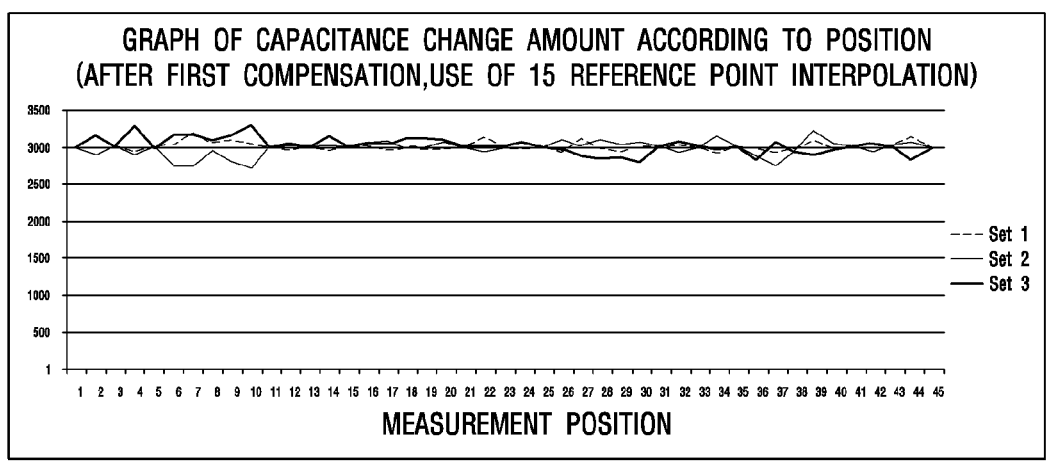
FIG. 13a is a graph showing a result obtained by applying a practical compensation step after the first compensation step in the sensitivity compensation method according to the embodiment of the present invention.

FIGS. 13a and 13b show the capacitance change amount at each position point (reference point and random point) when the substantive compensation steps (S110 to S150 of FIG. 4) has been performed one more time after the first compensation is made. Particularly, FIGS. 13a and 13b show that the compensation is made when the 15 reference points and the 30 random points are set.

Compared to the case where only the substantive compensation is made without the first compensation (see FIG. 9a), it can be found that the touch input device which has performed both of the first compensation and the substantive compensation has a more uniform pressure touch sensitivity.

Figure 14A:
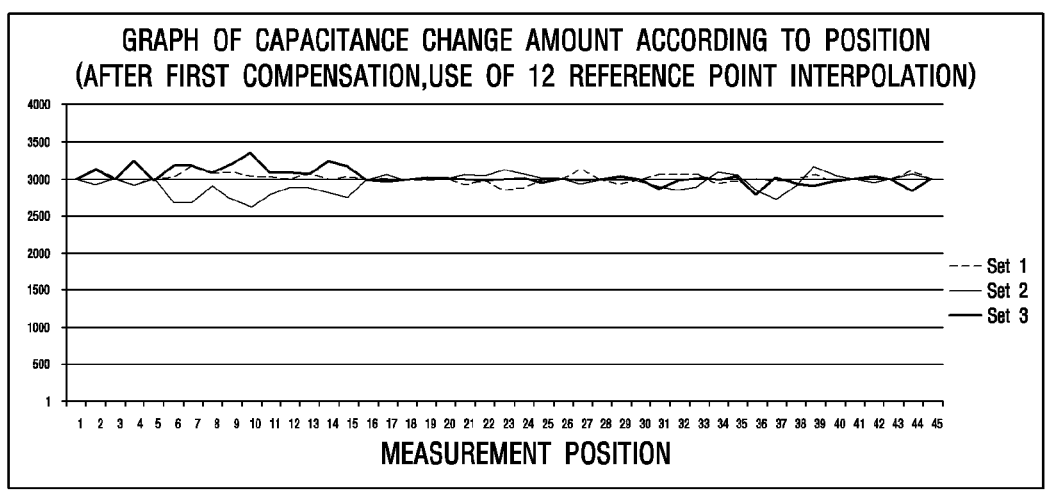
FIG. 14a is a graph showing a result obtained by applying a practical compensation step after the first compensation step in the sensitivity compensation method according to the embodiment of the present invention.

FIGS. 14a and 14b show the capacitance change amount at each position point (reference point and random point) when the substantive compensation steps (S110 to S150 of FIG. 4) has been performed one more time after the first compensation is made. Particularly, FIGS. 14a and 14b show that the compensation is made when the 12 reference points and the 33 random points are set.

Compared to the case where only the substantive compensation is made without the first compensation (see FIG. 10a), it can be found that the touch input device which has performed both of the first compensation and the substantive compensation has a more uniform pressure touch sensitivity.

Meanwhile, the present invention may be implemented in the form of a computer-readable recording medium which records a program performing each of the steps included in the above-described sensitivity compensation method.

In other words, the steps S110 to S150 (including or not the steps S210 to S250) can be performed by the program recorded in the recording medium according to the embodiment of the present invention.

The program instruction which is recorded in the computer readable recording medium may be specially designed and configured for the present invention or may be well-known and available to those skilled in the field of computer software.

The computer-readable recording medium may include a hardware device, for example, a magnetic medium such as a hard disk, a floppy disk, and a magnetic tape, an optical recording medium such as CD-ROM, DVD, a magneto-optical medium such as a floptical disk, and ROM, RAM, flash memory, etc., which is especially configured to store and perform program instructions.

The program instruction may include not only a machine language code which is formed by a complier but also high-level language code which can be executed by a computer using an interpreter, etc.

The hardware device may be configured to operate as one or more software modules in order to perform the process according to the present invention, and vice versa.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

The invention claimed is:

1. A sensitivity compensation method of a touch input device sensing a touch pressure, the sensitivity compensation method comprising:
    defining a plurality of reference points spaced apart from each other on a touch sensor panel;
    generating a reference data corresponding to a capacitance change amount sensed by applying a predetermined pressure to the plurality of reference points;
    generating, on the basis of the reference data, an interpolated data corresponding to a capacitance change amount for a random point present between the plurality of reference points;
    calculating, on the basis of the generated reference data and interpolated data, with respect to the reference point and random point respectively, a compensation factor for compensating a sensitivity of the touch input device to a target value; and
    compensating uniformly for the sensitivity of the touch input device by applying the calculated compensation factor to each corresponding points.

2. The sensitivity compensation method of claim 1, wherein the compensation factor corresponds to a value obtained by dividing the target value by the capacitance change amount recorded in the reference data and in the interpolated data and is calculated for the reference point and the random point respectively.

3. The sensitivity compensation method of claim 1, wherein, in the defining the reference point, the reference point is located at an intersection of n number of horizontal lines parallel to each other and m number of vertical lines parallel to each other on the touch sensor panel, so that n×m (n and m are natural numbers equal to or greater than 2) number of the reference points are defined.

4. The sensitivity compensation method of claim 1, wherein the interpolated data is generated based on the capacitance change amount detected at four reference points surrounding the random point and on a spaced distance between the random point and four reference points.

5. The sensitivity compensation method of claim 1, comprising
    defining, before defining the reference point, a plurality of position points on the touch sensor panel comprised in a plurality of the touch input devices;
    sensing the capacitance change amount by applying the same pressure to the plurality of position points;
    generating an average value data by calculating an average value of the capacitance change amount sensed at the same position between the plurality of touch input devices;
    calculating, on the basis of the average value data, a first compensation factor at the plurality of position points; and
    compensating uniformly the sensitivity of the touch input device by applying the first compensation factor to the plurality of position points.

6. The sensitivity compensation method of claim 5, wherein the first compensation factor corresponds to an inverse number of the average value.

7. The sensitivity compensation method of claim 5, wherein the plurality of position points are defined at the same position as those of the reference point and the random point.

8. A non-transitory computer-readable recording medium recording a program which performs:
- defining a plurality of reference points spaced apart from each other on a touch sensor panel;
- generating a reference data corresponding to a capacitance change amount sensed by applying a predetermined pressure to the plurality of reference points;
- generating, on the basis of the reference data, an interpolated data corresponding to a capacitance change amount for a random point present between the plurality of reference points;
- calculating, on the basis of the generated reference data and interpolated data, with respect to the reference point and random point respectively, a compensation factor for compensating a sensitivity of the touch input device to a target value; and
- compensating uniformly for the sensitivity of the touch input device by applying the calculated compensation factor to each corresponding points.

9. The non-transitory computer-readable recording medium of claim 8, wherein the program recorded in the computer-readable recording medium further performs:
- defining, before defining the reference point, a plurality of position points on the touch sensor panel comprised in a plurality of the touch input devices;
- sensing the capacitance change amount by applying the same pressure to the plurality of position points;
- generating an average value data by calculating an average value of the capacitance change amount sensed at the same position between the plurality of touch input devices;
- calculating, on the basis of the average value data, a first compensation factor at the plurality of position points; and
- compensating uniformly the sensitivity of the touch input device by applying the first compensation factor to the plurality of position points.

* * * * *